June 3, 1969 W. M. HUTCHINSON ET AL 3,448,391

KEYED FILTER USING RC CIRCUITS

Filed Dec. 13, 1966 Sheet 1 of 4

INVENTORS
WILLIAM M. HUTCHINSON
JERRY G. WILLIFORD
BY
Moody and Phillion
ATTORNEYS INVENTORS
WILLIAM M. HUTCHINSON
JERRY G. WILLIFORD
BY
Moody and Phillips
ATTORNEYS INVENTORS
WILLIAM M. HUTCHINSON
JERRY G. WILLIFORD
BY
Moody and Phillips
ATTORNEYS INVENTORS
WILLIAM M. HUTCHINSON
JERRY G. WILLIFORD
BY
Moody and Phillips
ATTORNEYS United States Patent Office 3,448,391
Patented June 3, 1969

3,448,391

KEYED FILTER USING RC CIRCUITS

William M. Hutchinson, Newport Beach, and Jerry G. Williford, Tustin, Calif., assignors to Collins Radio Company, Cedar Rapids, Iowa, a corporation of Iowa Filed Dec. 13, 1966, Ser. No. 601,499
Int. Cl. H03d 3/18
U.S. Cl. 329—50 4 Claims

ABSTRACT OF THE DISCLOSURE

This invention is a keyed filter for filtering a selected tone of frequency $f_0$ from a composite signal containing a plurality of such tones, orthogonally spaced apart by a frequency $f_d$. Data bits are encoded in bit-synchronous manner upon each tone with the nature of each bit being determined by the phase of said tone during the preceding bit. The keyed filter comprises a plurality of series circuits connected in parallel across the output of a gating means through which the composite signal is gated. Each series circuit consists of a capacitor and a switch, with the switches being opened in a sequential pattern and with each switch being opened at a repetition rate $f_0$. Electric charges are accumulated on each capacitor in proportion to the amplitude of the composite signal at the time the associated switch is opened. The gating means is opened during each bit period for a time interval $1/f_d$ so that the said accumulated charges are due only to the tone of frequency $f_0$. The circuit thus simulates a resonator.

In some prior art data transmission systems data is represented by the relationship of the phase of a tone signal with respect to a reference phase. Such reference phase can be the phase of said tone signal during the immediately preceding bit of information, or it might be the phase of an independently transmitted signal. As shown in United States Patent No. 2,833,917 issued to D. F. Babcock entitled, "Locking Oscillator Phase-Pulse Generator," and incorporated herein by reference, there is described means for encoding more than a single channel of information on a given tone. Said patent further describes the bit-synchronous manner of encoding wherein each bit of information is contained within one predetermined interval of time of a sequential succession of equal time intervals.

In United States Patent No. 2,905,812 to M. L. Doelz et al., in September 1959, and entitled, "High Information Capacity Phase-Pulse Multiplex System," there is shown detailed means for transmitting and receiving a series of tones each of a different frequency and each carrying more than one information channel. At the receiver there are employed a plurality of keyed filters. In some systems currently being used, two keyed filters are employed for each tone. Each of said keyed filters is tuned to the frequency $f_0$ of the tone with which it is associated. As will be discussed later herein, the various tones employed in the system are made to differ in frequency by an integral multiple of a selected difference frequency. For example, the tones employed might be frequencies of 20 kHz., 19.5 kHz., 19.0 kHz., 18.5 kHz., and 18.0 kHz. It will be observed that the difference between any two of these frequencies is 500 Hz., or some integral multiple of 500 Hz. The period $\tau$ of one complete cycle of the 500 Hz. difference frequency is 1/500 second, or two milliseconds. If a resonator tuned to one of said given frequencies, for example 19.0 kHz., is driven by a tone having a frequency of 18.5 kHz., the kinetic energy (i.e., oscillations) of the resonator will build up during the initial part of said period $\tau$ and will then decline to produce a null at the end of a period $\tau$. Qualitatively speaking, the reasons for such a null (or node) are as follows. As the 18.5 kHz. tone is applied to a nonexcited resonator at time $T_0$, oscillatory vibration will be induced in the resonator by the applied signal (assuming the resonator to be a mechanical resonator for purposes of discussion). However, since the resonator's natural frequency is 19.0 kHz., and the applied input signal has a frequency of 18.5 kHz., the phase of the applied signal will deviate in an increasing amount from the phase of the harmonic motion of the resonator and will eventually begin to oppose the motion of the resonator. When half the period $\tau$ has elapsed, the armonic motion of the resonator is near its peak, but the phase of the applied input signal is now 90° out of phase with the motion of the resonator and will no longer increase the oscillatory motion. When the phase difference exceeds 90°, the input signal will begin to suppress the harmonic motion of the resonator. Such suppression will continue until the end of the period $\tau$, at which time, in a theoretically lossless resonator, the harmonic motion will be of zero amplitude, the energy of the applied signal being employed to build up oscillations in the resonator being equal to the energy employed to suppress such oscillations.

Similarly, if a tone having a frequency differing by an integral multiple from the frequency of the keyed filter to which it is applied, is supplied to said keyed filter a node will appear at the end of the period $\tau$. However, in the case where the difference frequency is an integral multiple of 500 c.p.s., more than one node will appear during the period $\tau$; the number of nodes being equal to the multiplying factor. For example, if the difference frequency is 1,000 cycles per second, the number of nodes appearing during the period $\tau$ will be two, the second node appearing at the end of the period $\tau$ and coinciding with the node created by a tone having a difference frequency of only 500 cycles per second.

If, however, the tone applied to the keyed filter has a frequency equal to the tuned frequency of the tuned filter, a different result is reached. Since the frequencies are the same, the total energy of the applied input signal for the period $\tau$ will be employed to increase the amplitude of the harmonic motion of the resonator. The resonator is then in fact, a means for integrating the energy supplied thereto by the applied signal; the amplitude of the harmonic motion being proportional to the total energy supplied.

A further characteristic of the keyed filter is that the phase of the applied signal is integrated over the driving period $\tau$ so that perturbations of phase of any given cycle occurring in the received input signal become of much less importance; the phase of many cycles being averaged into the phase of the harmonic motion of the resonator.

Thus it can be seen that a keyed filter operated in a bit-synchronous manner can be driven for a period $\tau$ as defined above, at the end of which time all the tones received, except that particular tone to which the keyed filter is tuned, will have produced a null in the oscillatory motion of the resonator. Thus, since all nonselected tones are, at the end of the period $\tau$, cancelled out within the resonator, the resonator will continue to resonate freely only at the frequency of the selected tone and with the phase of the selected tone.

As described in the above-mentioned United States Patent No. 2,833,917, the keyed filters are frequently used in pairs in an alternate manner. That is to say, a first keyed filter is employed to receive a given data kit and is driven for a bit period $\tau$, and is then allowed to resonate freely. Immediately upon the termination of the first received bit, the input signal is supplied to the second keyed filter which is tuned to the same frequency as the first keyed filter. The second keyed filter is driven by the input signal for the duration of the next succeeding bit, during which time the first keyed filter is resonating with a phase equal to that of the first received bit. The phase of the second received bit is then compared with the phase of resonance of the first resonator as a reference to determine the information contained in the second bit.

As soon as the phase of the second received bit is compared with the phase of the reference bit, the said first resonator must be quenched in preparation for the reception of the next following bit. In most prior art keyed filter structures the resonator employed is either a mechanical filter of the stacked disc variety or a suitable crystal. Both the mechanical filter and the crystal are mechanical devices in that resonance consists of mechanical vibration.

It is desirable that quenching of one of the keyed filter resonators be accomplished as quickly as possible after comparison of the phases has been made. Any time used in quenching is, for all practical purposes, lost time. In other words, the shorter the quench time the greater the number of bits that can be transmitted in a given period of time. Since the mechanical resonator and the crystal are both mechanical devices, an appreciable amount of time is required to quench such structures. For example, in the case of a crystal about 800 microseconds are required to quench the resonance. A similar time period is required to quench a mechanical filter structure.

It would be possible to utilize an LC tank circuit in a keyed filter and to obtain relatively fast quenching simply by shorting the tank circuit. However, tank circuits have relatively low Q's, and a high Q is required to obtain good performance in a keyed filter circuit. Both the mechanical resonator and a crystal have the characteristics of high Q but, as discussed above, they require relatively large quenching times.

It might be noted that a high Q is desirable in order to obtain the orthogonal feature of the keyed filter as discussed above. A high Q assures linearity of buildup of resonance in the resonator in that loss is low and the increments of energy supplied to the resonator by any of the several tones in a composite signal will remain in the resonator over the entire drive time. The addition of all these increments of energy of any given tone, other than the selected tone, over the entire drive time will add up to zero energy, if the loss is low. On the other hand, if the Q is relatively low, with a correspondingly higher loss, then the increments of energy supplied to the resonator near the beginning of the drive time will have become attenuated over the drive time period so that they will not completely cancel out the energy supplied to the resonator near the end of the drive time. Thus some of the undesired tones will remain in the resonator at the end of the drive time and will produce objectionable cross talk.

Another consideration re the use of keyed filters is temperature stability. It has been found that keyed filters employing either a mechanical resonator or a crystal are subject to perturbations due to temperature changes. Consequently, in some applications where unusually close frequency tolerances are required, it is sometimes necessary to employ ovens in order to control the temperatures of the resonating elements.

It is an object of the present invention to provide a keyed filter having characteristics both of high Q and a relatively fast quenching time.

A second purpose of the invention is to provide a temperature stable keyed filter having a high Q and a fast quenching time.

A third aim of the invention is a temperature stable keyed filter having a fast quenching time.

A fourth purpose of the invention is the improvement of keyed filters generally.

In accordance with the invention there is provided a keyed filter circuit comprising a simulated resonant circuit, gating means for supplying a received composite signal to the input of said simulated resonant circuit for a drive time interval equal to $1/nf_d$ where $f_d$ is a frequency spacing between adjacent tones of the composite signal, and where $n$ is any integer, usually unity, and thereby causing a simulated resonant condition in the simulated resonant circuit at the frequency $f_1$ of the tone to be selected from the several tones forming the composite signal. There is further provided a quenching means for quenching the resonance of said simulated resonant circuit after a predetermined time interval.

The simulated resonant circuit comprises a plurality of series circuits connected in parallel across the input of said simulated resonant circuit; each of said series circuits individually comprising a capacitor in series with a switch. A signal generating means is provided to produce several trains of switching pulses, each train having a repetition rate equal to $f_1$ but having a different phase with respect to each of the other trains of pulses. A separate train of switching pulses is supplied to each switch to open said switch with a repetition rate $f_1$. Since the pulses of each train of pulses are interleaved, timewise, with the pulses of the other trains, the switches open at different points in time over each cycle of the frequency component $f_1$, thus allowing the said capacitors to individually acquire electrical charges of a magnitude in accordance with the phase of the cycle of the frequency $f_1$ at the time the associated switch is open.

Since the time that the composite signal is supplied to the simulated resonator is equal to $1/f_d$, only those electrical charge increments contributed by the signal component of frequency $f_1$ will remain on the capacitors at the end of the drive time. All of the charge increments contributed by the other tones will have cancelled out over the time interval $1/f_d$, since said other tones will have shifted an integral multiple of 360° with respect to the frequency $f_1$, as discussed above.

In accordance with the primary feature of the invention, the use of the simulated resonant circuit comprised of capacitors and switches results in a structure having a very high Q and short quenching time interval, and which is relatively temperature stable.

The above-mentioned and other objects and features of the invention will be more fully understood from the following detailed description thereof when read in conjunction with the drawings in which.

FIGS. 4A, 4B, 4C, 4D and 4E are a set of waveforms showing the operation of the simulated resonant circuit, with an arbitrary phase relation between the selected tone of the composite signal and the gating signals which open the switches in the simulated resonator; and FIG. 4F is another set of waveforms showing the operation of the simulated resonator, but with a tone which has a frequency different from the gating signals.

Figure 1:
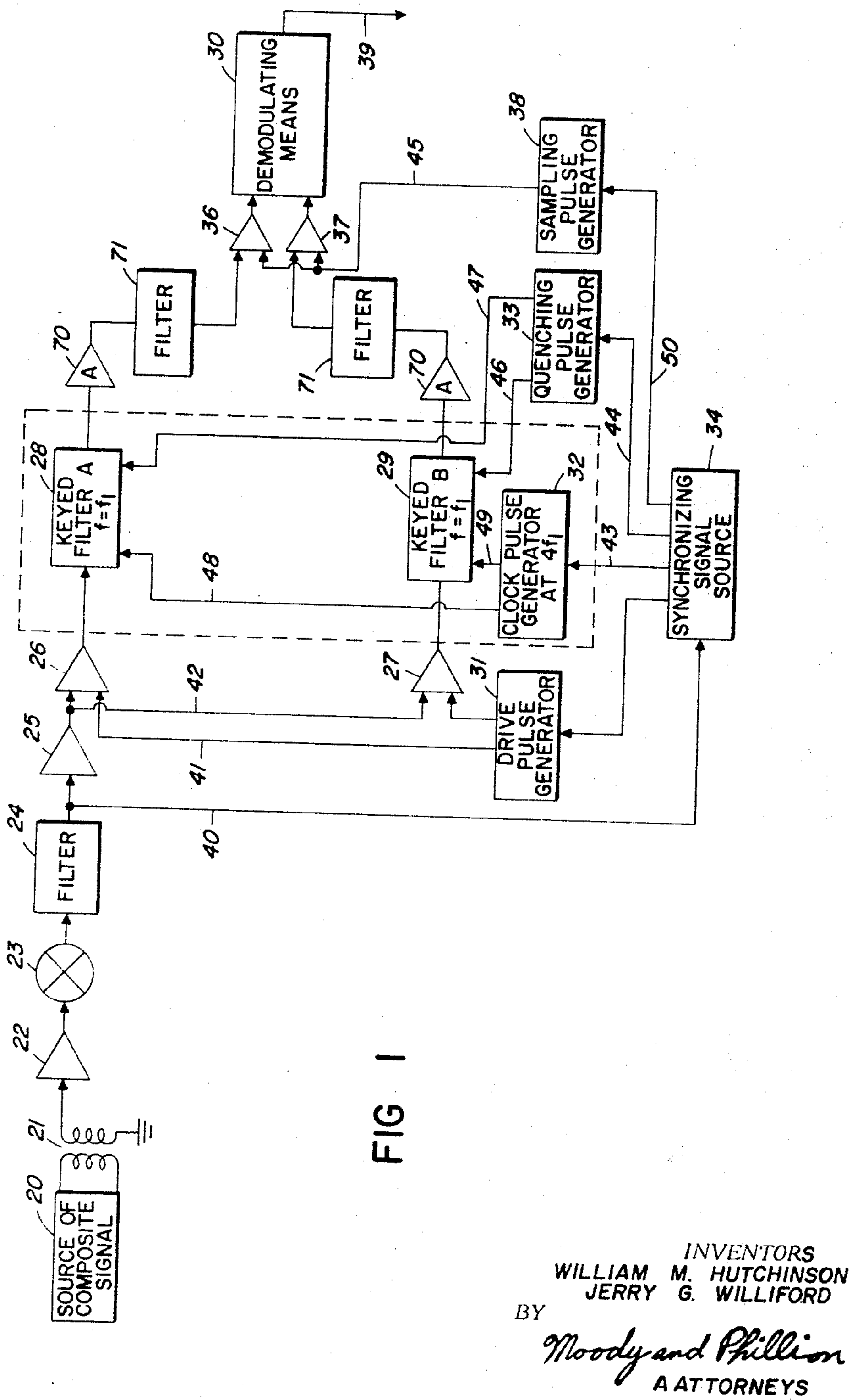
FIG. 1 is a generalized block diagram of a system in which keyed filters are employed and shows the timing means which are used in combination with the resonator to form the keyed filter.

Referring now to FIG. 1, a received composite signal from a source 20 is coupled by suitable means, such as transformer 21, to an input amplifier 22 of a receiver and then to a mixer 23 to remove the carrier signal if a carrier signal is employed.

From mixer 23 the composite signal is supplied through bandpass filter 24 to another amplifier 25, and then to the drive gates 26 and 27 which function to drive keyed filters 28 and 29, respectively.

Figure 3:
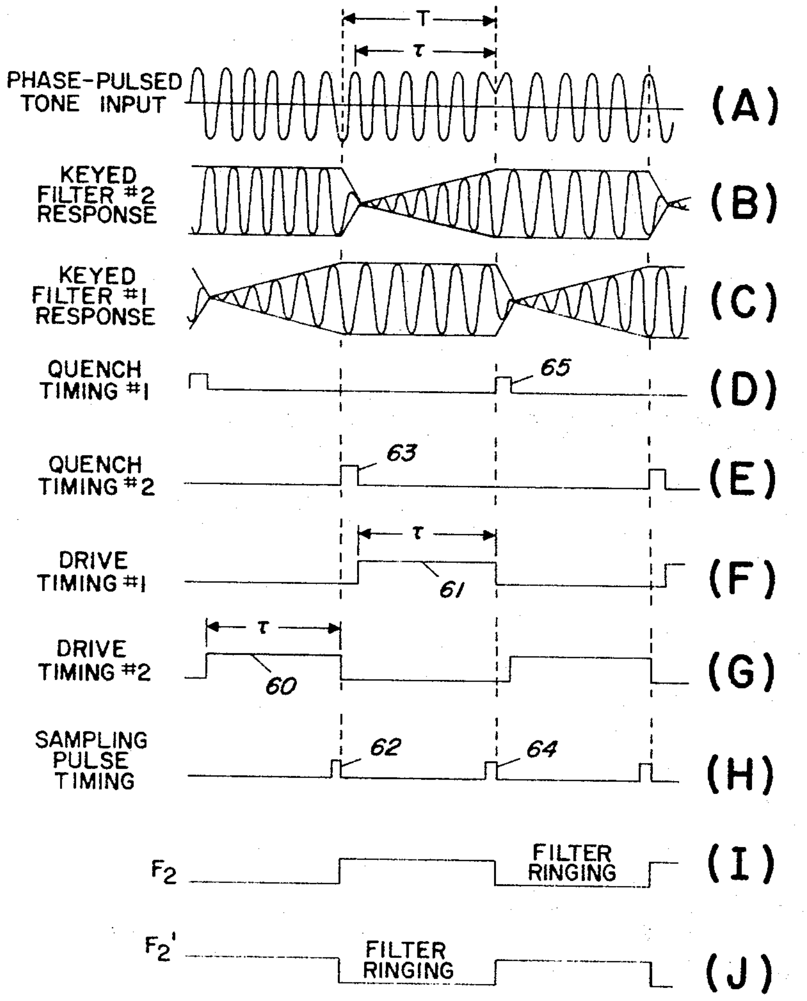
FIG. 3 is a set of waveforms showing the alternate operation of the pair of keyed filters of FIG. 1; i.e., both when being driven by the incoming composite signal and when functioning as a resonant circuit.

The drive gates 26 and 27 are opened alternately by the output waveforms of FIGS. 3F and 3G, respectively, in which the driving time is designated by the period $\tau$.

During the driving pulse 60 of FIG. 3G, gate 27 is open to permit the composite signal to energize keyed filter 29, as indicated in FIG. 3C. During this period of time the resonant condition of keyed filter 29 will gradually increase until the drive signal terminates, as shown in FIG. 3G.

During the time that keyed filter 29 is being driven, keyed filter 28 has been ringing, as shown in FIG. 3B. Near the termination of the driving pulse 60 and immediately before the occurrence of the quenching pulse 63 in FIG. 3E, a sampling pulse 62 in FIG. 3H is supplied from sampling pulse generator 38 of FIG. 1 to open output gates 36 and 37 and thereby permit a sampling of the signals in keyed filters 28 and 29 to enter demodulating means 30 where the phase relationship between the two signals is determined by well-known means.

The quenching pulse 63 of FIG. 3E is then supplied from quenching pulse generator 33 of FIG. 1 through lead 47 to quench keyed filter 28 in preparation for the driving pulse 61 of FIG. 3F. The said driving pulse 61 functions to open gate 26 to permit the composite signal of FIG. 3A to drive keyed filter 28 into a resonant condition in accordance with the phase of the composite signal during the driving time period 61.

At the end of the drive time 61, a second sampling pulse 64 functions to open sampling gates 36 and 37 (FIG. 1) to compare the signals in the two keyed filters 28 and 29 at this time. Immediately thereafter quenching pulse 65 is supplied from quenching circuit generator 33 of FIG. 1 via lead 46 to quench the signal in keyed filter 29. Such alternate operation of keyed filters 28 and 29 continues with the phase of the incoming signal always being compared with the phase of the ringing tone to determine the phase relationship between the two signals and thus the nature of the intelligence being transmitted. It should be noted, as discussed before, that the nature of the intelligence being transmitted in any given phasor is determined by the phase relation of said phasor with the phase of the immediately preceding phasor.

Figure 2:
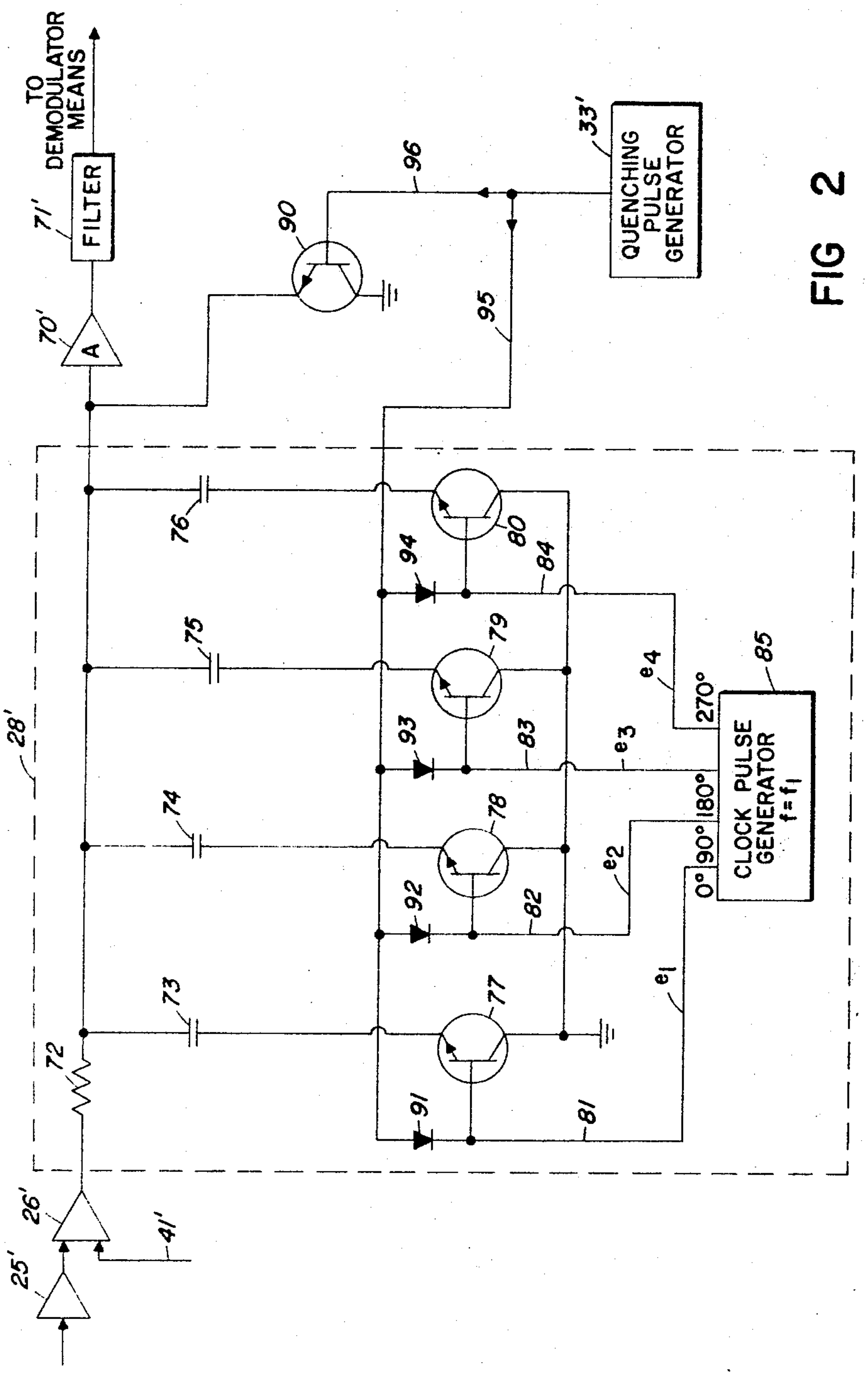
FIG. 2 is a schematic diagram of the resonator employing resistors, capacitors and transistorized switches.

Referring now to FIG. 2, there is shown a detailed schematic diagram of the keyed filter 28 of FIG. 1. Certain other elements of FIG. 1 are also shown in FIG. 2 and are identified by the same reference characters, although primed.

In FIG. 2 clock pulse generator 85 produces four trains of pulses on its four output leads 81, 82, 83, and 84. The repetition rate of the pulses in each of these trains of pulses is equal to the tone frequency of the selected tone $f_1$. Each train of pulses, however, is phase shifted with respect to each of the other trains of pulses so that the pulses are spaced apart 90°. Thus, for example, if the train of pulses $e_1$ appearing on output lead 81 is designated as having a zero degree phase relationship with the received tone signal $f_1$, then the pulse train $e_2$ will occur 90° later in each cycle of $f_1$, the train of pulses $e_3$ appearing on output lead 83 will occur 180° from the pulses of pulse train $e_1$, and the pulses of pulse train $e_4$ appearing on output lead 84 will occur 270° after the pulses of pulse train $e_1$. The aforementioned phase relationship of the four trains of output pulses from generator 85 is shown in the curves of FIGS. 4B, 4C, 4D, and 4E.

Referring now specifically to FIG. 4A, waveform 115 represents the tone signal of the received composite signal, and with frequency $f_1$. The curve of FIG. 4B represents the pulse train $e_1$ appearing on lead 81 of FIG. 2 and the curves of FIGS. 4C, 4D, and 4E represent, respectively, the pulse trains $e_2$, $e_3$, and $e_4$ appearing on output leads 82, 83, and 84 of FIG. 2.

Figure 4:
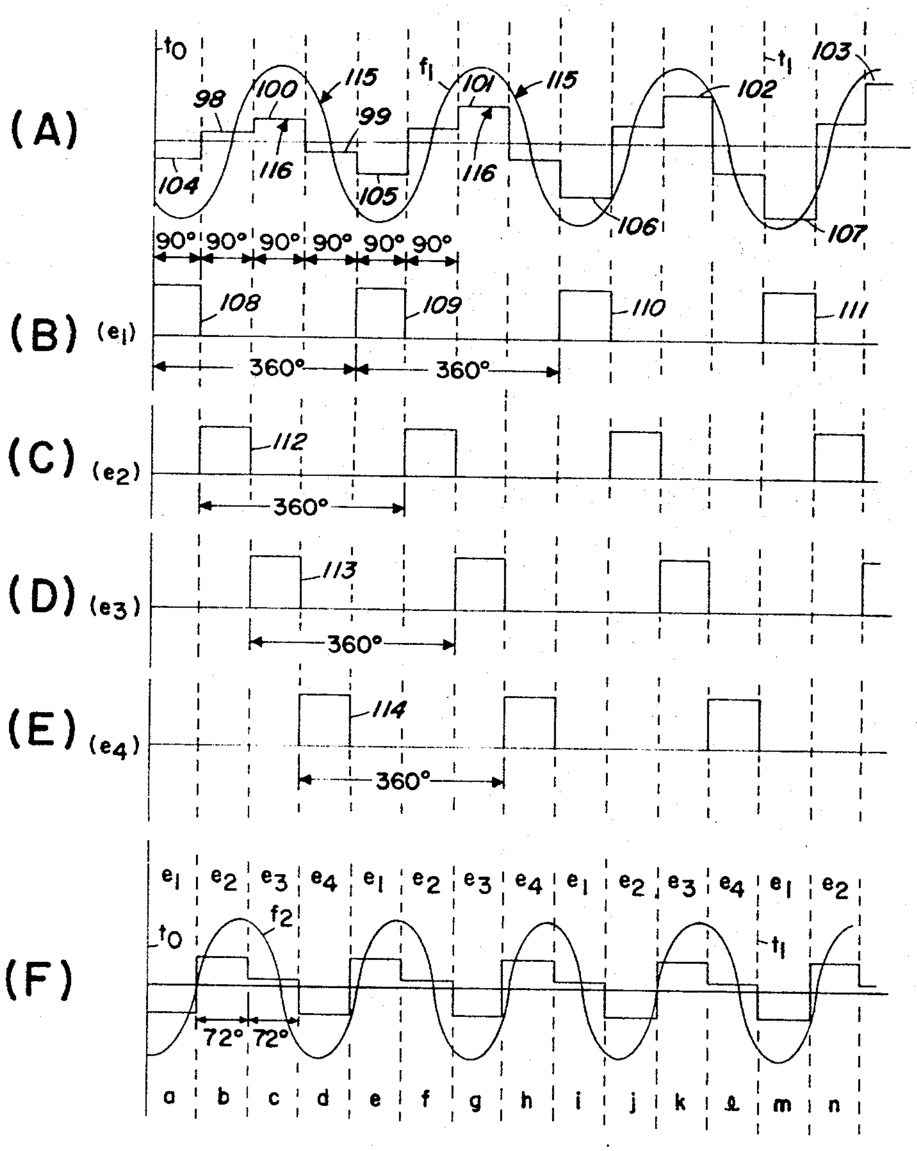

The stepped waveform 116 of FIG. 4A represents the waveform 115 as it is stored by accumulating charges on capacitors 73 through 76 of FIG. 2. More specifically, the individual step 104 of FIG. 4A represents the charge accumulated on capacitor 73 of FIG. 2 after the first sampling; step 98 represents the charge accumulated on capacitor 74 of FIG. 2 after the first sampling; step 100 represents charge accumulated on the capacitor 75 after the first sampling; and step 99 represents the charge accumulated on capacitor 76 after the first sampling. With each successive sampling the charge accumulated on each capacitor increases. For example, the step 101 represents the charge on capacitor 75 after the second sampling, and the individual step 102 represents the charge on capacitor 75 after the third sampling, and the step 103 represents the charge on capacitor 75 after the fourth sampling. It will be noted that the steps of accumulated charges 100, 101, 102, and 103, become progressively greater with each sampling. While only four step changes in the charge on capacitor 75 are shown in FIG. 4, it is to be understood that in the actual operation of the circuit there are, perhaps, several dozens of cycles during the build-up or drive period, as represented by the FIGS. 3B, 3C, 3F, and 3G. The charges on the capacitors 73 through 76 (FIG. 2), each build up to a maximum value dependent upon the average value of the signal component frequency $f_1$ during their particular 90° of the cycle of such signal component. Thus, capacitor 74 will not acquire as great a charge as capacitor 75 with the phase of sampling as shown in FIG. 4, simply because the average magnitude of the signal 115 of FIG. 3A during pulse train $e_2$ is small compared to the average amplitude of the signal 115 90° later when sampled by the pulse train $e_3$ into capacitor 75.

In the manner described above, the signal component of frequency $f_1$ is filtered from the composite signal and is represented by charges accumulated on capacitors 73 through 76. It is to be noted, specifically, that the phase relation between the pulse trains $e_1$ through $e_4$ and the signal 115 is unimportant. No matter what the phase relationship, some pattern of charge will be created on the capacitors 73 through 76 which will be due only to the tone of frequency $f_1$. All the other increments of charge supplied to capacitors 73 through 76 by the other tones will have completely canceled out over the drive time period as described hereinbefore.

As a specific example of the cancellation of the charge increments of another tone, reference is made to FIG. 4F which shows a tone frequency $f_2$. The frequency $f_2$ is 1.25 that of $f_1$, so that for every four cycles of the frequency $f_1$ there will occur five cycles of $f_2$. Thus in FIG. 4, over the four cycles of $f_1$ beginning at time $t_0$ and extending to time $t_1$ there will occur five cycles of the frequency $f_2$. It can be seen that the samplings by pulse trains $e_1$ through $e_4$ substantially cancel out over the five cycles since they no longer reoccur over the same 90-degree segments of each cycle of the signal $f_2$. To illustrate, the signal $f_2$ has been divided into segments A, B, C, . . . M, N, which correspond to 90° segments of the frequency $f_1$, and which correspond to only 72° segments of the signal $f_2$. Examining, for example, the samplings of the pulse train $e_1$ which occur during segments A, E, I, and M, it can be seen that the total accumulated charge is zero. A similar net electrical charge of zero is obtained for the samplings of the pulse trains $e_2$, $e_3$, and $e_4$ over the five cycles of $f_2$. Thus only the signal component of frequency $f_1$, which is equal to the repetition rate of the pulse trains $e_1$ through $e_4$ result in the accumulation of a charge on the capacitors 73 through 76.

The pulse trains $e_1$ through $e_4$ function to open the transistors 77, 78, 79, and 80, respectively, in successive order. For example, the pulse 108 in pulse train $e_1$ (FIG. 4) will open the gate 77 of FIG. 2 over a 90° segment of the signal component frequency $f_1$. The pulse 112 of pulse train $e_2$ will open transistor 78 to permit the composite signal to deposit an electrical charge on capacitor 74 in accordance with the magnitude of the composite signal during the next 90° segment of the input signal $f_1$. In a similar manner pulses 113 and 114 of pulse trains $e_3$ and $e_4$ open transistors 79 and 80 to permit the charges to be accumulated on capacitors 75 and 76 in accordance with the average energy level of the composite signal during the time such pulses are present.

The drive pulses, as shown in FIG. 3F, are supplied via lead 41' (FIG. 2) to input gates 26'. As discussed above, during the presence of such drive pulses the composite signal is supplied to the filter 28' and charges capacitors 73 through 76 during the time that any of the associated switches 77 through 80 are opened to complete the circuit.

At the end of the drive time gate 26' becomes closed, that is, nonconductive, but the charges on capacitors 73 through 76 will remain. The resistive discharge paths now become almost infinite and a relatively long period of time is required for capacitors 73 through 76 to discharge, even though transistor switches 77 through 80 are still opening up on a periodic basis in accordance with the pulse trains supplied from the clock pulse generator 85.

A high impedance amplifier 70' detects the electrical charge level on each of the capacitors 73 through 76 as the associated transistor switches 77 through 80 are caused to be opened by one of the switching pulses of FIGS. 4B through 4E. Since the amplifier 70' is a high impedance amplifier very little dissipation of the charge is caused by the detection of the charge thereon.

The actual signal supplied to amplifier 70' is a step signal of the nature identified by reference character 116 of FIG. 4A and the output of amplifier 70' will be a waveform of substantially the same shape. It is to be understood, however, that after the drive pulse has terminated, the amount of charge on capacitors 73 through 76 will remain substantially constant and the signal supplied to amplifier 70' will comprise the ringing period shown in FIGS. 3I and 3J. It should be remembered that two filters of the type shown in FIG. 2 are actually employed in the system as illustrated in FIG. 1, and that while one is ringing the other is being driven up to the point of ringing. Sampling takes place, as discussed above, at a point in time just at the completion of the drive time.

Returning again to the function of amplifier 70', the output signal therefrom will be a step type signal which is then filtered by filter 71' to produce a sinewave signal. Such sinewave signal is then supplied to a demodulator means 30 of FIG. 1.

At the termination of the ringing period it is desired to quench the filter circuit as quickly as possible. In the particular filter circuit of FIG. 2, quenching is accomplished by discharging the capacitors 73 through 76 as rapidly as possible and is effected as follows. A quenching pulse from source 33' is supplied to the base of transistor 90 to cause said transistor to become conductive. At the same time the quenching pulse is supplied through lead 95 and diodes 91, 92, 93, and 94 to the bases of transistors 77, 78, 79, and 80 to cause said transistors to become conductive. Thus paths are completed through transistor 90 on one side of capacitors 73 through 76, and through transistors 77 through 80 on the other side of the capacitors 73 through 76 to effect a rapid discharge of said capacitors. The time interval involved for such discharge can be made of the order of 100 microseconds as compared with about 800 microseconds required to quench a mechanical filter or a crystal filter.

It is to be understood that the invention described herein is but a preferred embodiment thereof and that various changes can be made in circuit arrangement as, for example, in the type switches employed and the quenching circuit employed, without departing from the spirit or the scope thereof.

We claim:

1. In a time synchronous data bit system a keyed filter means comprising:

first gating means for receiving a composite signal comprised of a plurality of tones spaced apart by integral multiples of a difference frequency $f_d$ and in which the lowest tone frequency is an integral multiple of $f_d$;

a plurality of N series circuits each comprising a capacitor means and a switching means with said circuits being connected in parallel with each other with respect to the output of first said gating means;

clock pulse generating means for generating N trains of pulses with each train having a frequency equal to the frequency of the tone which is to be filtered through said keyed filter means, and with said trains of pulses being phase spaced apart by 360°/N;

each of said switching means being constructed to become conductive in response to the pulses of a given one of said trains of pulses to cause said received composite signal to conduct an increment of charge to the capacitor connected in series therewith;

driving pulse means for opening said first gating means at the beginning of a bit frame for an interval of time equal to $M/f_d$, where M is an integer;

and means for discharging said capacitors near the end of each bit frame.

2. In a system employing time synchronous data bits, means for demodulating a composite tone consisting of a plurality of tones spaced apart by an integral multiple of frequency $f_d$ and with the lowest tone being an integral multiple of $f_d$;

said demodulating means comprising:

first and second keyed filters;

driving means;

first gating means responsive to said driving means to supply the bit frames of said composite signal alternately to said first and second keyed filters;

each of said keyed filters constructed to ring at the frequency of the tone selected to be passed therethrough during the bit frame following that bit frame in which the composite signal was supplied thereto;

phase comparing means for comparing the phases of the signal in the ringing keyed filter and the signal in the driven keyed filter at the end of the driving period;

each of said keyed filters comprising:

a plurality of N series circuits each comprising a capacitor means and a switching means with said circuits being connected in parallel with each other with respect to the output of said gating means;

clock pulse generating means for generating N trains of pulses with each train having a frequency equal to the frequency of the tone which is to be filtered through said keyed filter, and with said trains of pulses being phase spaced apart by 360°/N;

each of said switching means being constructed to become conductive in response to the pulses of a given one of said trains of pulses to cause said received composite signal to conduct an increment of charge to the capacitor connected in series therewith;

and means for discharging said capacitors near the end of each bit frame.

3. In a time synchronous data bit system a keyed filter means comprising:

first gating means for receiving a composite signal comprised of a plurality of tones spaced apart by integral multiples of a difference frequency $f_d$ and in which the lowest tone frequency is an integral multiple of $f_d$;

a plurality of N series circuits each comprising a capacitor means and a switching means with said circuits being connected in parallel with each other with respect to the output of said first gating means;

means for opening said switches sequentially with each switch being opened at a repetition rate equal to the frequency of the tone to be passed through the said keyed filter means;

driving pulse means for opening said first gating means at the beginning of a bit frame for an interval of time equal to $M/f_d$, where M is an integer;

and means for discharging said capacitors near the end of a bit frame.

4. In a system employing time synchronous data bits, means for demodulating a composite tone consisting of a plurality of tones spaced apart by an integral multiple of frequency $f_d$ and with the lowest tone being an integral multiple of $f_d$;

said demodulating means comprising:

first and second keyed filter means;

driving means;

first gating means responsive to said driving means to supply the bit frames of said composite signal alternately to said first and second keyed filter means;

each of said keyed filter means constructed to ring at the frequency of the tone selected to be passed therethrough during the bit frame following that bit frame in which the composite signal was supplied thereto;

phase comparing means for comparing the phases of the signal of the ringing keyed filter and the signal in the driven keyed filter at the end of the driving period;

each of said keyed filters comprising:

a plurality of N series circuits each comprising a capacitor means and a switching means with said circuits being connected in paralled with each other with respect to the output of said gating means;

means for opening said switches sequentially with each switch being opened at a repetition rate equal to the frequency of the tone to be passed through the said keyed filter means;

and means for discharging said capacitors near the end of the bit frame in which ringing occurs.

References Cited

UNITED STATES PATENTS

| | | | |
|---|---|---|---|
| 2,905,812 | 9/1959 | Doelz et al. | 328—103 X |
| 3,348,203 | 10/1967 | Allen | 328—110 X |
| 3,381,241 | 4/1968 | Haugh | 328—67 X |

ALFRED L. BRODY, *Primary Examiner.*

U.S. Cl. X.R.

307—246, 269; 325—468; 328—133, 109; 329—103